United States Patent
Yeh et al.

(10) Patent No.: US 8,736,246 B2
(45) Date of Patent: May 27, 2014

(54) POWER FACTOR CONTROL CIRCUIT AND POWER FACTOR CONTROL METHOD

(75) Inventors: Chia-An Yeh, New Taipei (TW); Hsiang-Yi Chen, New Taipei (TW)

(73) Assignee: Acbel Polytech Inc., New Taipei (TW)

( * ) Notice: Subject to any disclaimer, the term of this patent is extended or adjusted under 35 U.S.C. 154(b) by 126 days.

(21) Appl. No.: 13/240,247

(22) Filed: Sep. 22, 2011

(65) Prior Publication Data
US 2013/0076317 A1 Mar. 28, 2013

(51) Int. Cl.
*H02J 3/38* (2006.01)

(52) U.S. Cl.
USPC .............................. 323/285; 323/207; 363/89

(58) Field of Classification Search
USPC ......... 323/209, 205, 207, 222, 284, 285, 282; 363/89, 84, 78, 74
See application file for complete search history.

(56) References Cited

U.S. PATENT DOCUMENTS

| | | | | |
|---|---|---|---|---|
| 7,403,400 B2* | 7/2008 | Stanley | | 363/16 |
| 7,969,125 B2* | 6/2011 | Melanson | | 323/222 |
| 8,120,341 B2* | 2/2012 | Melanson | | 323/282 |
| 8,130,522 B2* | 3/2012 | Maksimovic | | 363/89 |
| 8,278,899 B2* | 10/2012 | Schafmeister et al. | | 323/283 |
| 2012/0075889 A1* | 3/2012 | Sasaki | | 363/21.09 |

* cited by examiner

*Primary Examiner* — Gary L Laxton
*Assistant Examiner* — Kyle J Moody
(74) *Attorney, Agent, or Firm* — Ming Chow; Sinorica, LLC

(57) ABSTRACT

A power factor control circuit has a power factor controller that determines if the power factor control circuit is operated at a continuous current mode (CCM) or a discrete current mode (DCM), and outputs PWM signals corresponding to the present current mode. A duty cycle of the PWM signals is equal to a sum of a feed-forward control parameter and a current compensation parameter. The current compensation parameter contains a difference value between a reference current and an inductor current in the power factor control circuit. Accordingly, a switching power supply circuit can acquire the PWM signals corresponding to the present current mode to effectively resolve the issue of harmonic distortion.

16 Claims, 9 Drawing Sheets

POWER FACTOR CONTROL CIRCUIT AND POWER FACTOR CONTROL METHOD

BACKGROUND OF THE INVENTION

1. Field of the Invention

The present invention relates to a power factor control circuit and power factor control method, and more particularly to a control circuit and a control method outputting pulse width modulation (PWM) signals in accordance with a present current mode at which a switching power supply circuit is operated.

2. Description of the Related Art

With reference to FIG. 5, to convert an AC mains (Vac) into a DC power supply and supply the DC power to a load 60, a rectifier 50 and a switching power supply circuit 70 are connected between the AC mains (Vac) and the load 60. The rectifier 50 converts the AC power into the DC power. An input terminal of the switching power supply circuit 70 is connected to an output terminal of the rectifier 50 so that the switching power supply circuit 70 converts the DC power into a more stable DC power and supplies the more stable DC power to the load 60 through an output terminal thereof. The switching power supply circuit 70 has a power factor correction (PFC) circuit 71 and a DC to DC converter 72. DC voltages having different voltage levels (for example 28V, 12V), which are converted by the DC to DC converter 72 from a voltage (for example 380V) that is outputted from the PFC circuit 71, is further outputted to the load 60.

The PFC circuit 71 has an inductor L, an output capacitor C and an active switch 711, a first proportional integral amplifier 81, a second proportional integral amplifier 82, a multiplexer 83 and a driver 84. The active switch 711 is connected between the inductor L and the output capacitor C and has a control terminal.

The first proportional integral amplifier 81 has two input terminals and an output terminal. The input terminals are respectively connected to an output terminal of the PFC circuit 71 and a reference voltage $V_{ref1}$, and the output terminal is connected to one input terminal of the multiplexer 83. Another input terminal of the multiplexer 83 is connected to the output terminal of the rectifier 50.

The second proportional integral amplifier 82 has two input terminals respectively connected to the output terminal of the rectifier 50 and an output terminal of the multiplexer 83.

The driver 84 has two input terminals respectively connected to an output terminal of the second proportional integral amplifier 82 and a reference voltage $V_{ref2}$. An output terminal of the driver 84 is connected to the control terminal of the active switch 711.

A conventional power factor control method in collaboration with the foregoing circuits is described as follows. The first proportional integral amplifier 81 outputs a voltage error signal $V_{error}$ based on a difference between an actual output voltage of the PFC circuit 71 and the reference voltage $V_{ref1}$. The second proportional integral amplifier 82 outputs a voltage signal $I_{error}$ indicative of a current error to the driver 84 in accordance with an inductor current $I_L$ and the voltage error signal $V_{error}$. The driver 84 outputs a PWM signal to the control terminal of the active switch 711 to control a duty cycle D when the active switch 711 turns on in accordance with the voltage signal $I_{error}$ and the reference voltage $V_{ref2}$.

To let the PFC circuit 71 output a stable voltage $V_{out}$, the relationship among the duty cycle D, an actual voltage $V_{in,sense}$ and a preset output voltage $V_{out}$ can be expressed by an equation as follows.

$$D = 1 - \frac{V_{in,sense}}{V_{out}}$$

As the duty cycle of the PWM signal is obtained according to the voltage signal $I_{error}$ and the voltage signal $I_{error}$ contains the components of the actual input voltage, the inductor current and the actual output voltage, the power factor can be enhanced by adequately configuring the PFC circuit.

Whenever the actual output voltage differs from the reference voltage $V_{ref1}$ and the inductor current $I_L$ differs from the voltage signal $I_{error}$ in the PFC circuit 71, the driver 84 can output a corresponding PWM signal.

A switching power supply circuit can be operated at different current modes, such as a continuous current mode (CCM) and a discrete current mode (DCM), by varying a load condition. When the switching power supply circuit is operated at the CCM, the active switch 711 turns on during the duty cycle of the PWM signal so that the inductor L is charged and the current passing through the inductor increases. The active switch 711 turns off when operating outside the duty cycle of the PWM signal so that the inductor L discharges. Before the inductor L discharges all its stored energy, the PWM signal triggers the active switch 711 to turn on again so that the inductor L can be charged to an even higher current level. During the course of repeatedly being charged and discharging, the waveform of an average current of the inductor L follows the waveform of the input voltage.

When operated at the DCM, the current of the PFC circuit 71 is relatively lower than that at the CCM. When operating within the duty cycle of the PWM signal, the active switch 711 turns on so that the inductor L is charged and the current passing through the inductor increases. When operated outside the duty cycle of the PWM signal, the inductor L discharges all its stored energy and is charged at next duty cycle so that the average current passing through the inductor L is relatively lower than that when operated at the CCM.

As shown in the circuit design illustrated in FIG. 5, if the duty cycle of the PWM signal has been designed to satisfy the CCM, the power factor during the CCM can be definitely improved. However, when the PFC circuit 71 is operated at the DCM, the PWM signal continues using the duty cycle for the CCM. When the inductor L is operated outside the duty cycles of the PWM signal and discharges all its stored energy, the energy storage components of the PFC circuit 71, such as diode, boost capacitor and the like, feed back their stored energy to the input terminal of the PFC circuit 71 to cause serious harmonic distortion at the input terminal.

With reference to FIG. 6, to tackle the foregoing shortcoming, an improved PFC circuit 71' is shown. The PFC circuit 71' is characterized in a snubber circuit 73 parallelly connected with the active switch 711' in the PFC circuit 71'. The snubber circuit 73 has a diode 730, a resistor 731 and a capacitor 732. The diode 730 and the resistor 731 are parallelly connected and then are commonly and serially connected with the capacitor 732. The anode side of the diode 730 is connected to the inductor L, and the cathode side is connected to the capacitor 732. If the PFC circuit 71' is operated at the DCM and within the duty cycle of the PWM signal, part of the stored energy of the energy storage components, such as inductor L, diode D and boost capacitor C of the boost power supply circuit, is absorbed by the snubber circuit 73, thereby effectively reducing the harmonic distortion at the input terminal of the boost power supply circuit.

Whereas, the diode 730, the resistor 731 and the capacitor 732 pertain to passive components, which usually consume energy during the conversion process of the boost power supply circuit, lower the conversion efficiency of the boost power supply circuit, and give rise to low-frequency oscillation to input current.

With reference to FIG. 7, research developers have brought forth a control circuit targeting at determining a currently operating current mode of a switching power supply circuit and varying the duty cycle of the PWM signals corresponding to the present current mode.

Similarly, such control circuit has a rectifier 90 and a PFC circuit 91. An input terminal of the rectifier 90 is connected to an AC mains (Vac). An input terminal of the PFC circuit 91 is connected to an output terminal of the rectifier 90. The PFC circuit 91 has an inductor L, a capacitor C, an active switch 910 and a power factor controller 92.

The rectifier 90 receives a mains power, converts the mains power into a DC power and outputs the DC power.

The input terminal $V_{in}$ of the PFC circuit 91 is connected to the output terminal of the rectifier 90. The PFC circuit 91 can be operated at the CCM or the DCM. The PFC circuit 91 can be exemplified by a boost power circuit.

Input terminals of the power factor controller 92 are respectively connected to the input terminal and the output terminal of the PFC circuit 91 to acquire an input voltage $V_{in,\,sense}$, an output voltage $V_{out,\,sense}$ and an inductor current $I_{L,\,sense}$. The power factor controller 92 has an output control terminal connected to the active switch 910.

With reference to FIG. 8, the power factor controller 92 has a computation unit 923 embedded therein and can be operated at a CCM 921 and a DCM 922.

In accordance with the characteristic relation of power factor correction, the computation unit 923 determines at which current mode the power factor controller 92 is operated by comparing two values $D_1$ and $D_2$ expressed as follows.

$$D_1 = \sqrt{\frac{2L}{V_{in,sense}T_S} \cdot i_{REF} \cdot \left(1 - \frac{V_{in,sense}}{V_{out,sense}}\right)}$$

$$D_2 = 1 - \frac{V_{in,sense}}{V_{out,sense}}$$

If $D_1 > D_2$, the computation unit 923 determines that the power factor controller 92 is operated at the CCM 921 and switches the power factor controller 92 to be operated at the CCM. A PWM signal having a duty cycle as follows is inputted from the output control terminal of the power factor controller 92.

$$D = \left(1 - \frac{V_{in,sense}}{V_{out}}\right) + \left[\frac{L}{V_{out}T_S}(i_{REF} - I_{L,sense})\right]$$

where
 L represents the inductor value;
 $V_{in,sense}$ represents the input voltage;
 $V_{out,sense}$ represents the output voltage;
 $V_{out}$ represents the rated output voltage;
 $T_s$ represents the cycle of a PWM signal; and
 $i_{REF}$ represents a parameter amplified by a proportional integral of an error value between the output voltage $V_{out,sense}$ and a reference voltage.

An analysis of the above duty cycle indicates that the part $$1 - \frac{V_{in,sense}}{V_{out}}$$

is a theoretical value and the part $$\frac{L}{V_{out}T_S}(i_{REF} - I_{L,sense})$$

represents a compensation parameter.

If $D_1 < D_2$, the computation unit 923 determines that the power factor controller 92 is operated at the DCM 922 and switches the power factor controller 92 to be operated at the DCM. A PWM signal having a duty cycle expressed as follows is outputted from the output control terminal of the power factor controller 92.

$$D = \sqrt{\frac{2L}{V_{in,sense}T_S} \cdot i_{REF} \cdot \left(1 - \frac{V_{in,sense}}{V_{out}}\right)}$$

An analysis of the above duty cycle indicates that the entire portion of $$\sqrt{\frac{2L}{V_{in,sense}T_S} \cdot i_{REF} \cdot \left(1 - \frac{V_{in,sense}}{V_{out}}\right)}$$

is a theoretical value.

The power factor controller 92 can actively vary the PWM signals based on a currently operating mode of the PFC circuit 91 so as to improve the harmonic distortion arising from the PWM signals mismatching with the operating mode of the PFC circuit 91.

When the PFC circuit 91 is operated at the CCM, the duty cycle contains a theoretical value and a compensation parameter to compensate for deficiency of the theoretical value. However, when the PFC is operated at the DCM, the duty cycle expressed by $$\sqrt{\frac{2L}{V_{in,sense}T_S} \cdot i_{REF} \cdot \left(1 - \frac{V_{in,sense}}{V_{out}}\right)}$$

and outputted from the power factor controller 92 is merely a theoretical value. If the theoretical value is directly applied to an actual circuit when operated at the DCM, the reducing of the harmonic distortion is not substantial as illustrated by waveforms of the input voltage and input current in FIG. 9.

SUMMARY OF THE INVENTION

An objective of the present invention is to provide a control circuit and a power factor control method outputting PWM signals in accordance with a present current mode of a switching power supply circuit.

To achieve the foregoing objective, the power factor control circuit has an input terminal, an output terminal, an inductor, an output capacitor, a diode, an active switch and a power factor controller.

The power factor controller is connected to the input terminal and the output terminal of the power factor control circuit, has an output control terminal connected to the active switch, determines that the power factor control circuit is operated at one of a continuous current mode (CCM) and a discrete current mode (DCM), and outputs PWM signals corresponding to the current mode operated by the power factor control circuit. The PWM signals corresponding to the CCM have a duty cycle being equal to a sum of a feed-forward control parameter and a current compensation parameter. The PWM signals corresponding to the DCM have a duty cycle being equal to a sum of a feed-forward control parameter and a current compensation parameter. The current compensation parameter has a difference value between a reference current and an inductor current.

To achieve the foregoing objective, the power factor control method is executed in a power factor control circuit having an inductor, and has steps of:

determining if a present current mode operated by the power factor control circuit is a CCM or a DCM;

if the present current mode is the CCM, outputting a PWM signal, wherein a duty cycle of the PWM signal is equal to a sum of a feed-forward control parameter and a current compensation parameter, and the current compensation parameter has a difference value of a reference current and an inductor current; and if the present current mode is the DCM, outputting a PWM signal, wherein a duty cycle of the PWM signal is equal to a sum of a feed-forward control parameter and a current compensation parameter, and the current compensation parameter has a difference value of a reference current and an inductor current.

The power factor control circuit and the power factor control method output PWM signals to a switching power supply circuit according to a present current mode at which the switching power supply is operated to simultaneously meet a heavy load requirement or a light load requirement connected to the switching power supply circuit, thereby effectively resolving the issue of harmonic distortion.

Other objectives, advantages and novel features of the invention will become more apparent from the following detailed description when taken in conjunction with the accompanying drawings.

DETAILED DESCRIPTION OF THE INVENTION

Figure 1:
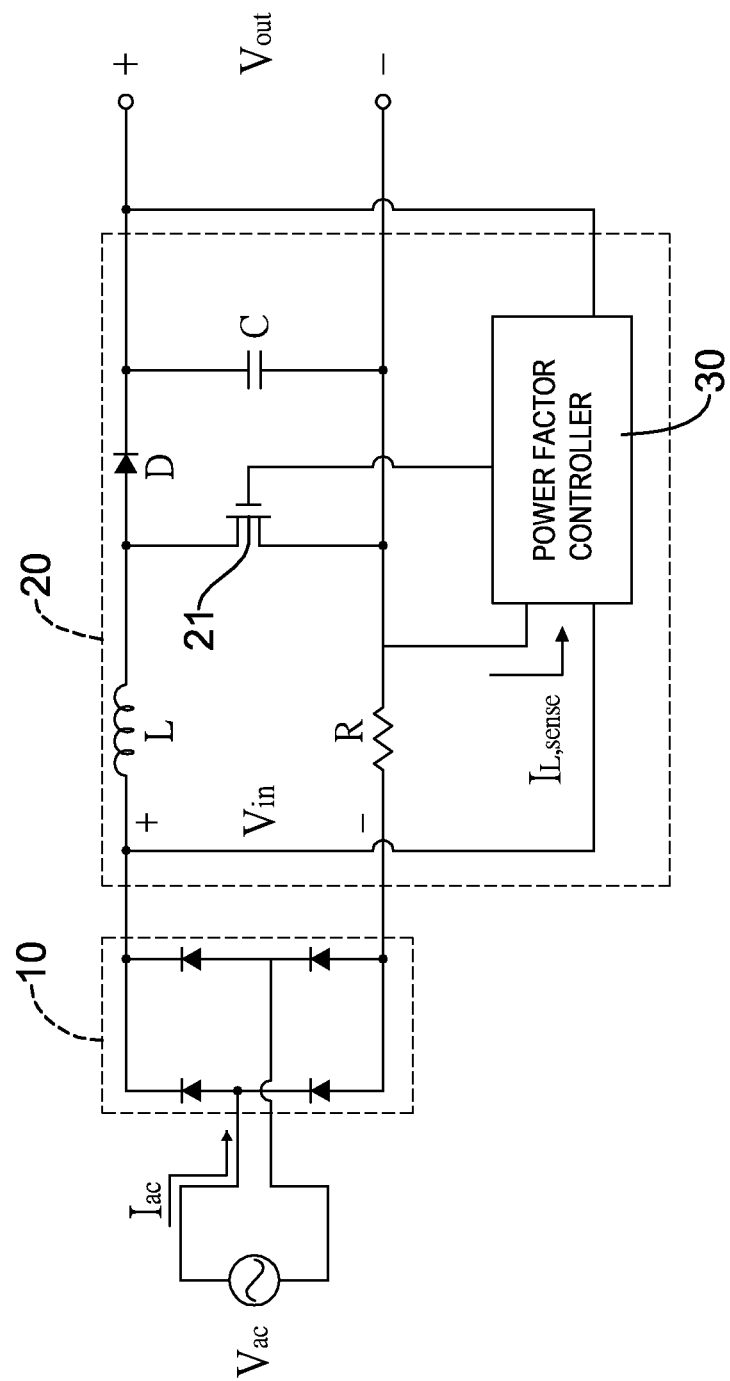
FIG. 1 is a circuit diagram of a boost power circuit having a power factor controller in accordance with the present invention.

With reference to FIG. 1, a first embodiment of a power factor control circuit 20 in accordance with the present invention is connected to an AC power supply (Vac) through a rectifier 10. The rectifier 10 converts the power supplied by the AC power supply into a DC power and supplies the DC power through an output terminal thereof. The power factor control circuit 20 may be a boost converter or a buck converter that are both feasible to be operated at a CCM or a DCM. Given the boost converter as an example, the power factor control circuit 20 has an inductor L, a diode D, an output capacitor C, a resistor R, an active switch 21 and a power factor controller 30.

The inductor L, the diode D, the output capacitor C, the resistor R and the rectifier 10 are serially connected to constitute a loop. The active switch 21 is connected between the anode side of the diode D and the resistor R, and has a control terminal. Both ends of the output capacitor C are respectively connected to a set of output terminals of the power factor control circuit 20 and the output capacitor C has a voltage drop $V_{out}$. The power factor controller 30 is connected between an input terminal and one of the output terminals of the power factor control circuit 20, and has an output control terminal connected to the control terminal of the active switch 21.

Figure 2:
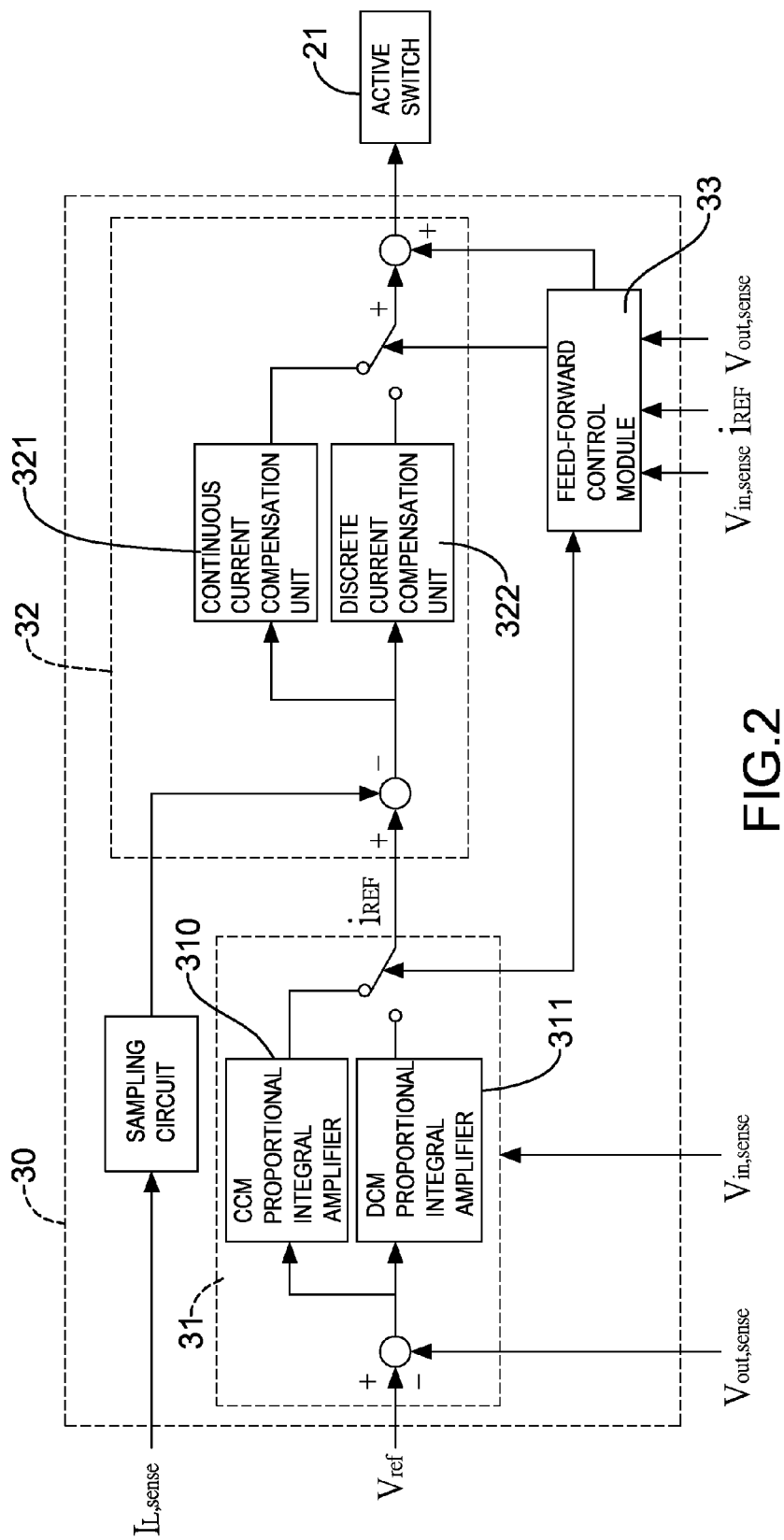
FIG. 2 is a functional block diagram of the power factor controller in FIG. 1.

With reference to FIG. 2, the power factor controller 30 has a voltage loop control module 31, a current loop control module 32 and a feed-forward control module 33.

The voltage loop control module 31 has a CCM proportional integral amplifier 310 and a DCM proportional integral amplifier 311. The CCM proportional integral amplifier 310 has a proportional parameter $K_{P,\ CCM}$ and an integral parameter $K_{I,\ CCM}$. The DCM proportional integral amplifier 311 has a proportional parameter $K_{P,\ DCM}$ and an integral parameter $K_{I,\ DCM}$. An input terminal of the voltage loop control module 31 is connected to a reference voltage $V_{ref}$ and the input terminal and the output terminals of the power factor control circuit 20 for obtaining a difference value between the reference voltage $V_{ref}$ and an output voltage $V_{out,\ sense}$ of the power factor control circuit 20. After being amplified by proportional integral through the CCM proportional integral amplifier or the DCM proportional integral amplifier, the difference value is multiplied by an actual input voltage $V_{in,\ sense}$ of the power factor control circuit 20 to output a reference current $i_{REF}$.

The current loop control module 32 is connected to an output terminal of the voltage loop control module 31 and the resistor R of the power factor control circuit 20, serves to output a PWM signal to the active switch 21, and has the output control terminal of the power factor controller 30. A current passing through the resistor R is equal to an inductor current $I_{L,\ sense}$ of the power factor control circuit 20. The current loop control module 32 receives the reference current $i_{REF}$ and the inductor current $I_{L,\ sense}$ and obtains a difference ($i_{REF} - I_{L,\ sense}$) thereof. The current loop control module 32 has a continuous current compensation unit 321 and a discrete current compensation unit 322, and each compensation unit 321, 322 generates a current compensation parameter in accordance with a corresponding difference value. According to the characteristic relation of power factor correction for a boost power circuit, the current compensation parameter generated by the continuous current compensation unit 321 is $$\frac{L}{V_{out}T_S}(i_{REF} - I_{L,sense}),$$

and the current compensation parameter generated by the discrete current compensation unit 322 is $F_m(i_{REF}-I_{L,sense})$.

Where L represents an inductance value;

$V_{out}$ represents an rated output voltage of the power factor control circuit;

$I_{L,sense}$ represents the inductor current;

$F_m$ represents a compensation constant;

$T_s$ represents a cycle of each PWM signal; and $i_{REF}$ represents a reference current containing a component of the output voltage $V_{out,\ sense}$ of the power factor control circuit.

The feed-forward control module 33 has multiple input terminals respectively connected to the output terminal of the voltage loop control module 31 and the input terminal and output terminals of the power factor control circuit 20, and two output control terminals of the feed-forward module 33 respectively connected to the current loop control module 32 and the voltage loop control module 31. The feed-forward control module 33 determines if the power factor control circuit 20 is operated at a CCM or a DCM in accordance with the input voltage $V_{in,\ sense}$, the output voltage $V_{out,\ sense}$ and the reference current $i_{REF}$ outputted from the voltage loop control module 31, and switches to the CCM proportional integral amplifier 310 or the DCM proportional integral amplifier 311 in the voltage loop control module 31 and switches to the continuous current compensation unit 321 or the discrete current compensation unit 322 in the current loop control module 32 under the CCM or the DCM. The feed-forward control module 33 generates a corresponding feed-forward control parameter under the CCM or the DCM and sends the feed-forward control parameter to the current loop control module 32. The current loop control module 32 outputs a PWM signal to the active switch 21. The duty cycle of each PWM signal is equal to a sum of a corresponding feed-forward control parameter and a corresponding current compensation parameter generated by the current loop control module 32.

Similar to the conventional technique, the feed-forward control module 33 compares two values $D_1$ and $D_2$ calculated by the following equations to determine a currently operating current mode.

$$D_1 = \sqrt{\frac{2L}{V_{in,sense}T_S} \cdot i_{REF} \cdot \left(1 - \frac{V_{in,sense}}{V_{out,sense}}\right)}$$

$$D_2 = 1 - \frac{V_{in,sense}}{V_{out,sense}}$$

If $D_1 < D_2$, the feed-forward control module 33 determines that the boost converter is operated at the DCM. According to the characteristic relation for power factor correction, the feed-forward control parameter generated in the DCM is expressed by $$\sqrt{\frac{2L}{V_{in,sense}T_S} \cdot i_{REF} \cdot \left(1 - \frac{V_{in,sense}}{V_{out}}\right)}$$

If $D_1 > D_2$, the feed-forward control module 33 determines that the boost converter is operated at the CCM. According to the characteristic relation for power factor correction, the feed-forward control parameter generated in the CCM is expressed by $$1 - \frac{V_{in,sense}}{V_{out}}.$$

Where L represents the inductor value;

$V_{in,\ sense}$ represents the input voltage of the power factor control circuit;

$V_{out,\ sense}$ represents the output voltage of the power factor control circuit;

$V_{out}$ represents the rated output voltage of the power factor control circuit;

$T_s$ represents the cycle of each PWM signal; and $i_{REF}$ represents the reference current containing the component of the output voltage $V_{out,\ sense}$ of the power factor control circuit.

When determining that the power factor control circuit 20 is operated at the CCM, the feed-forward control module 33 switches the voltage loop control module 31 to the CCM proportional integral amplifier 310 so that the voltage loop control module 31 outputs the proportional parameter $K_{P,\ CCM}$ and the integral parameter $K_{I,\ CCM}$, switches the current loop control module 32 to the continuous current compensation unit 321 and lets a current compensation parameter generated by the continuous current compensation unit 321 be $$\frac{L}{V_{out}T_S}(i_{REF} - I_{L,sense}).$$

The feed-forward control module 33 further generates a corresponding feed-forward control parameter $$1 - \frac{V_{in,sense}}{V_{out}}$$

and outputs the feed-forward control parameter to the current loop control module 32. After summing up the feed-forward control parameter and the current compensation parameter, the current loop control module 32 outputs PWM signals each having a duty cycle D expressed below to the control terminal of the active switch 21.

$$D = \left(1 - \frac{V_{in,sense}}{V_{out}}\right) + \left[\frac{L}{V_{out}T_S}(i_{REF} - I_{L,sense})\right]$$

The duty cycle is equal to the sum of the feed-forward control parameter and the current compensation parameter corresponding to the CCM.

Similarly, when determining that the power factor control circuit 20 is operated at the DCM, the feed-forward control module 33 switches the voltage loop control module 31 to the DCM proportional integral amplifier 311, switches the current loop control module 32 to the discrete current compensation unit 322, and outputs PWM signals each having a duty cycle D expressed below to the control terminal of the active switch 21.

$$D = \sqrt{\frac{2L}{V_{in,sense}T_S} \cdot i_{REF} \cdot \left(1 - \frac{V_{in,sense}}{V_{out}}\right)} + F_m(i_{REF} - I_{L,sense})$$

Figure 3:
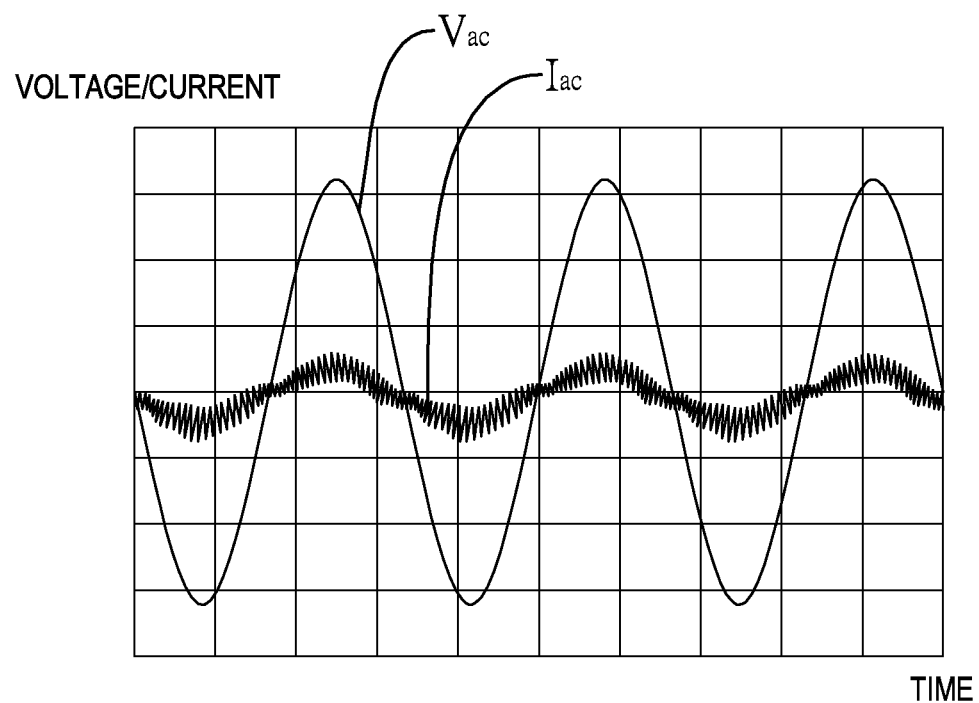
FIG. 3 is a graph showing the waveforms of input voltages and input currents of the boost power circuit in FIG. 1 with current compensation.
Figure 9:
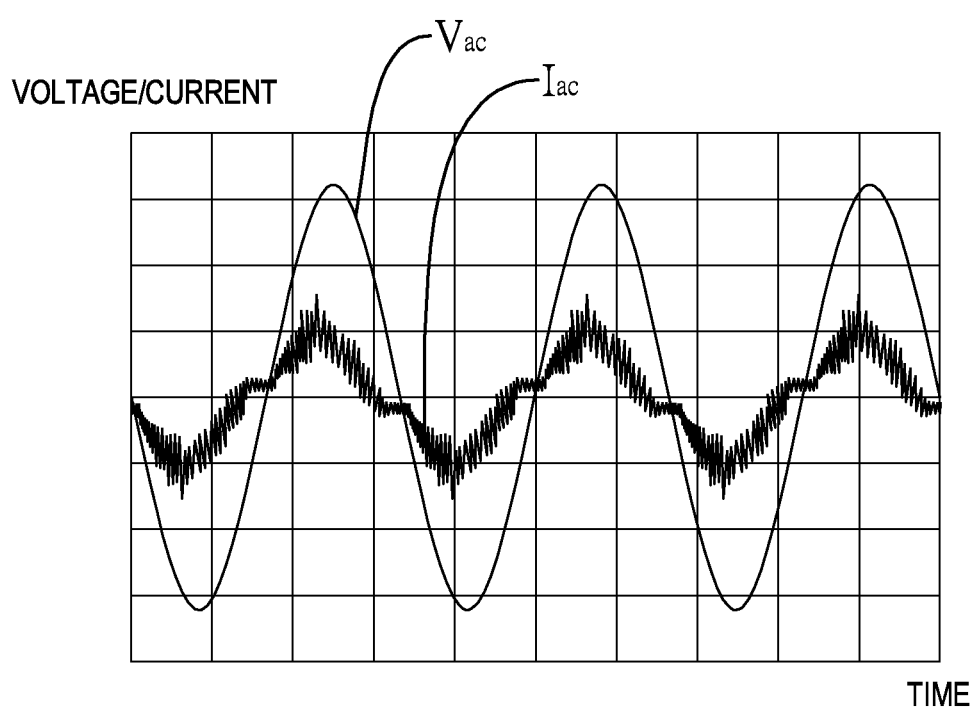
FIG. 9 is a graph showing the waveforms of input voltages and input currents of the switching power supply circuit in FIG. 7.

In sum, the feed-forward control module 33 can determine at which current mode the power factor control circuit 20 is operated and switch a corresponding proportional integral amplifier in the voltage loop control module 31 and a corresponding current compensation unit in the current loop control module 32 so that the current loop control module 32 outputs corresponding PWM signals to the active switch 21 in accordance with the currently operating current mode. The current compensation parameter in the PWM signals under each current mode is generated according to the difference value ($i_{REF}-I_{L,sense}$) between the reference current $i_{REF}$ detected in the power factor control circuit 20 and the inductor current $I_{L,sense}$ outputted from the voltage loop control module 31. With reference to FIGS. 3 and 9 and the following Table 1, the waveforms in FIG. 3 associated with the input voltage and input current of the power factor control circuit of the present invention operated at the DCM show that the waveform of the input current $I_{ac}$ approximates to that of the input voltage $V_{ac}$. In contrast to conventional technique, the duty cycle of the PWM signals of the present invention during the DCM is calculated as follows.

$$D = \sqrt{\frac{2L}{V_{in,sense}T_S} \cdot i_{REF} \cdot \left(1 - \frac{V_{in,sense}}{V_{out}}\right)} + F_m(i_{REF} - I_{L,sense})$$

As obtained from the difference value between the actual inductor current $I_{L,sense}$ and the reference current $i_{REF}$, the duty cycle is not merely a theoretical value, thereby effectively adjusting power factor and improving the harmonic issue.

TABLE 1

| Comparison table of total harmonic distortion between conventional technique and the present invention | | | | |
|---|---|---|---|---|
| Load | 10% | 20% | 50% | 100% |
| THD by conventional technique | 26.87% | 17.50% | 7.93% | 3.29% |
| THD by the present invention | 17.99% | 11.46% | 6.84% | 3.07% |

Figure 4:
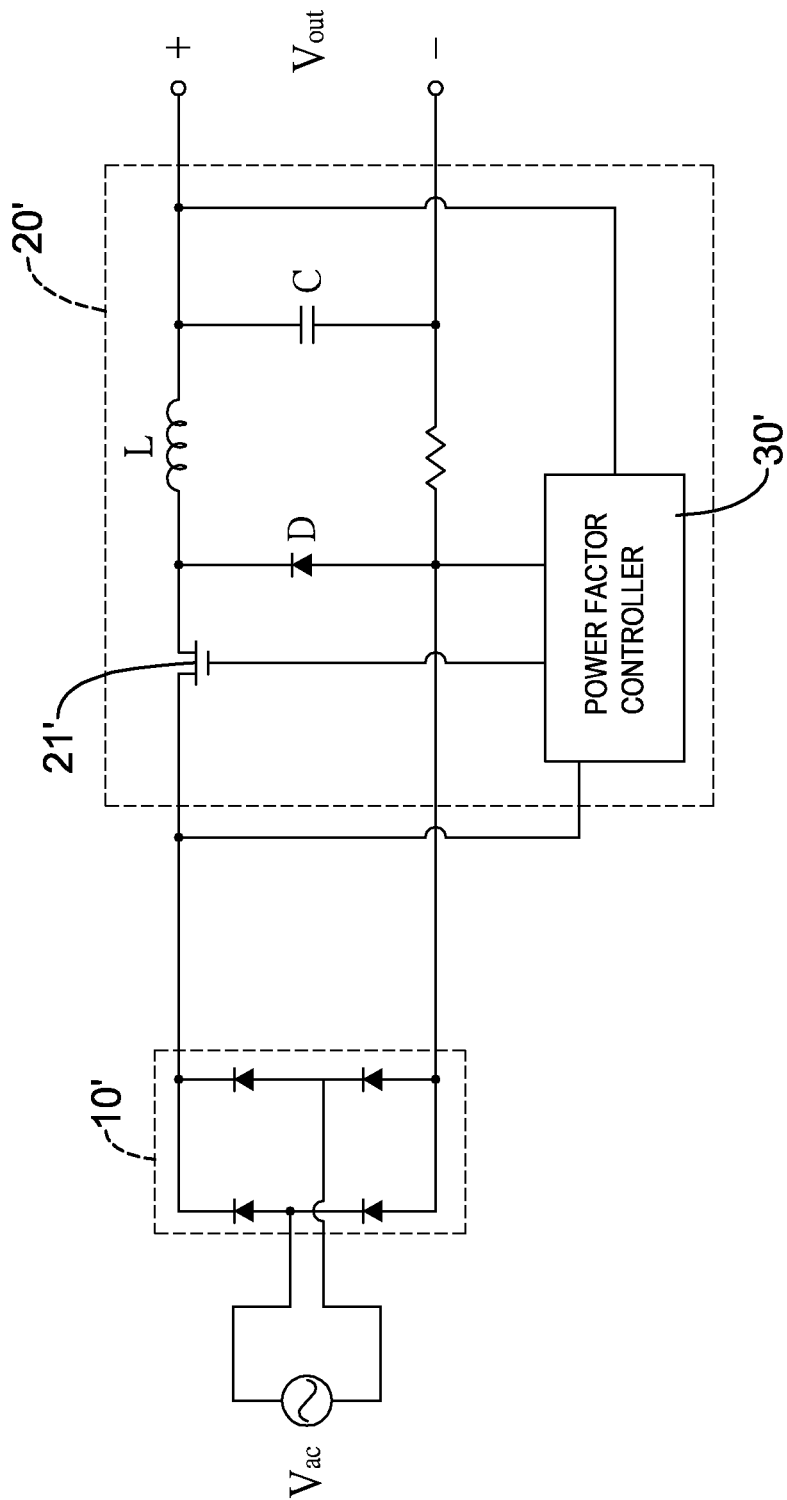
FIG. 4 is a circuit diagram of a buck power circuit having the power factor controller in FIG. 2.
Figure 5:
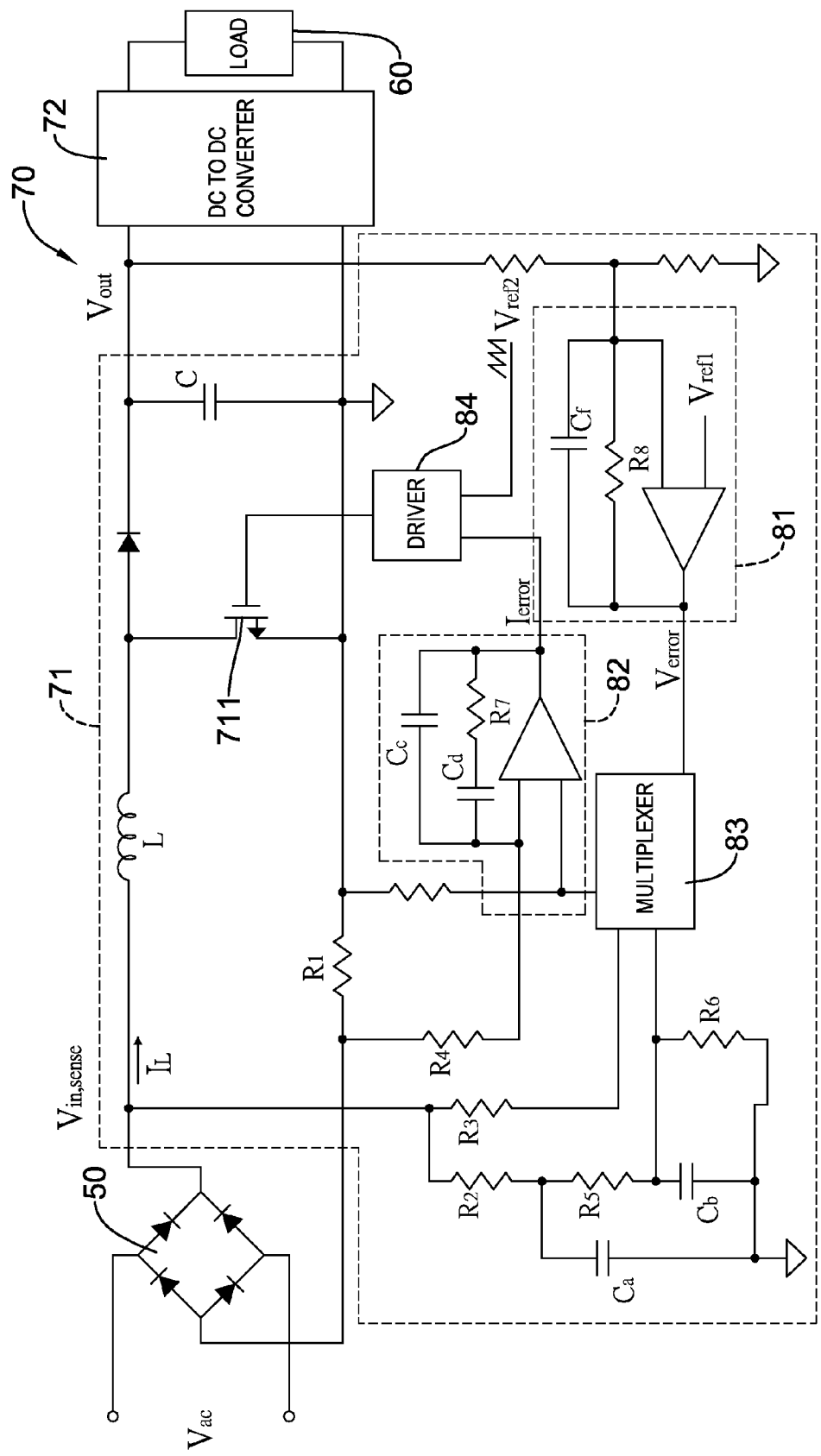
FIG. 5 is a circuit diagram of a first conventional switching power supply circuit having a PFC circuit.
Figure 6:
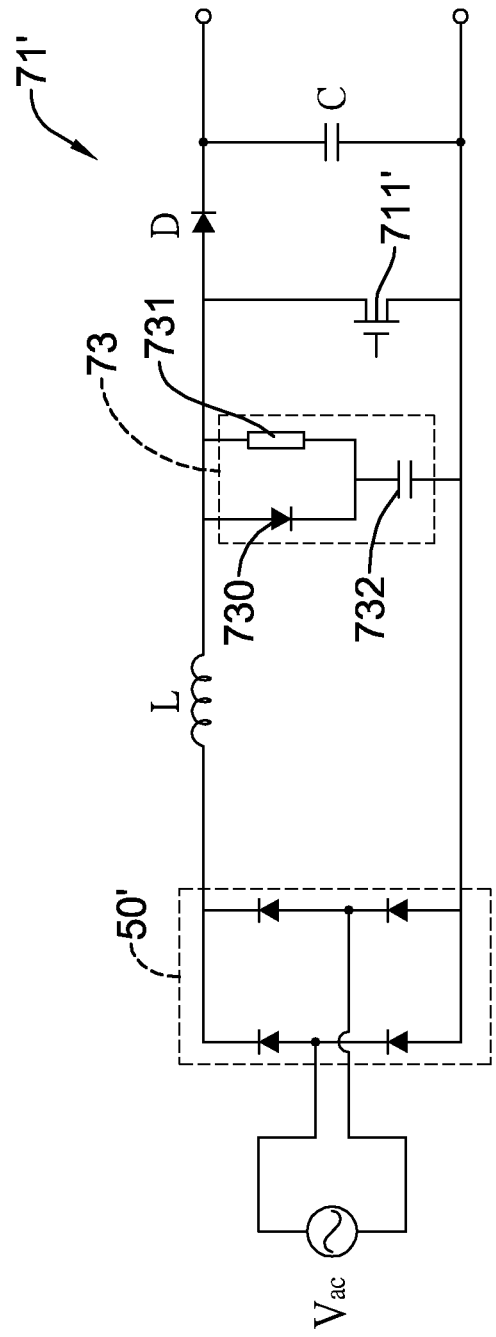
FIG. 6 is a circuit diagram of a second conventional switching power supply circuit having a PFC circuit.
Figure 7:
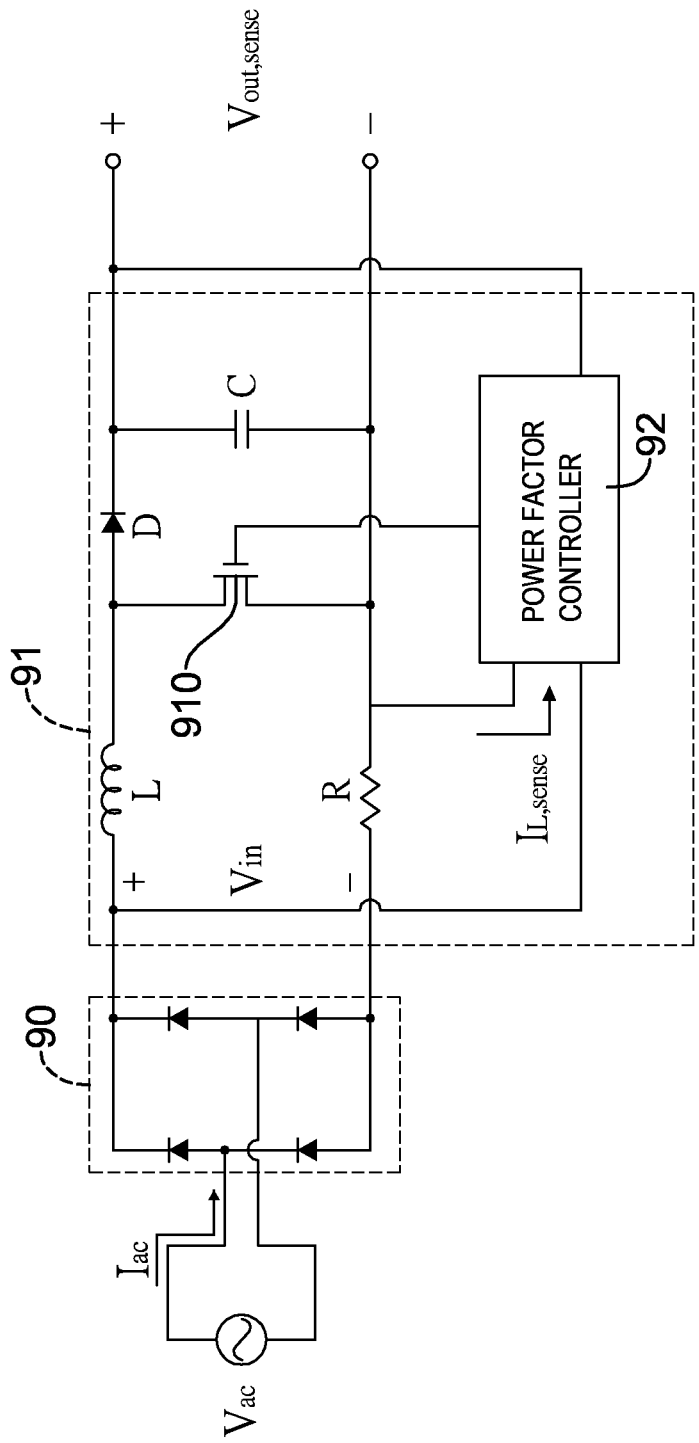
FIG. 7 is a circuit diagram of a third conventional switching power supply circuit having a power factor controller.
Figure 8:
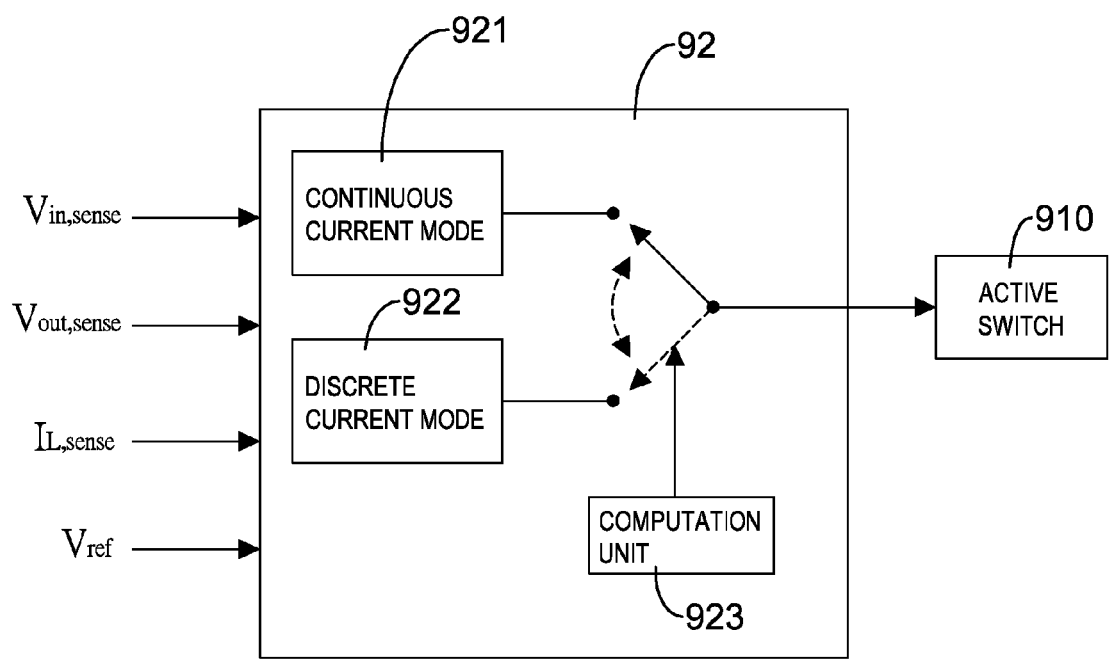
FIG. 8 is a functional block diagram of the power factor controller in FIG. 7.

With reference to FIG. 4, a first embodiment of a power factor control circuit 20' in accordance with the present invention is a buck converter and has an active switch 21', a diode D, an inductor L, an output capacitor C and a power factor controller 30'. The active switch 21', the inductor L, the output capacitor C and the rectifier 10' are serially connected to constitute a loop. The active switch 21' has a control terminal. The anode of the diode D is connected to an output terminal of the rectifier 10', and the cathode of the diode is connected between the active switch 21' and the inductor L. The power factor controller 30' is connected to an input terminal and an output terminal of the power factor control circuit 20' and has an output control terminal connected to the control terminal of the active switch 21'.

In the present embodiment, the power factor controller 30' compares $D_1$ and D2 specified as follows to determine if the currently operating mode is the CCM or the DCM.

$$D_1 = \sqrt{\frac{2L}{V_{in,sense}T_S} \cdot i_{REF} \cdot \left(\frac{V_{out,sense}}{V_{in,sense}} - 1\right)}$$

$$D_2 = \frac{V_{out,sense}}{V_{in,sense}}$$

If $D_1<D_2$, the power factor controller 30' determines that the power factor control circuit 20' is operated at the DCM. If $D_1>D_2$, the power factor controller 30' determines that the power factor control circuit 20' is operated at the CCM. If the power factor control circuit 20' is operated at the DCM, the feed-forward control parameter generated by the feed-forward control module in the power factor controller 30' is $$\sqrt{\frac{2L}{V_{in,sense}T_S} \cdot i_{REF} \cdot \left(\frac{V_{out}}{V_{in,sense}} - 1\right)},$$

the current compensation parameter is $F_m(i_{REF}-I_{L,sense})$, and the duty cycle of each PWM signal under the CCM is therefore equal to $$\sqrt{\frac{2L}{V_{in,sense}T_S} \cdot i_{REF} \cdot \left(\frac{V_{out}}{V_{in,sense}} - 1\right)} + F_m(i_{REF} - I_{L,sense});$$

if the power factor control circuit 20' is operated at the DCM, the feed-forward control parameter generated by the feed-forward control module in the power factor controller 30' is $$\frac{V_{out}}{V_{in,sense}},$$

the current compensation parameter is $$\frac{L}{V_{in,sense}T_S}(i_{REF} - I_{L,sense}),$$

and the duty cycle of each PWM signal under the DCM is therefore equal to $$\frac{V_{out}}{V_{in,sense}} + \frac{L}{V_{in,sense}T_S}(i_{REF} - I_{L,sense});$$

Where L represents the inductance value;
$V_{in,sense}$ represents the input voltage of the power factor control circuit;
$V_{out,sense}$ represents the output voltage of the power factor control circuit;
$V_{out}$ represents a rated output voltage of the power factor control circuit;
$I_{L,sense}$ represents the inductor current;

$F_m$ represents the compensation constant;

$T_s$ represents the cycle of each PWM signal; and $i_{REF}$ represents the reference current containing the component of the output voltage $V_{out, sense}$ of the power factor control circuit.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power factor control circuit comprising:

an input terminal, an output terminal, an inductor, an output capacitor, a diode, an active switch, and a power factor controller connected to the input terminal and the output terminal of the power factor control circuit, and having an output control terminal connected to the active switch;

wherein the power factor controller has:

a voltage loop control module generating a reference current according to a difference value between an output voltage of the power factor control circuit and a reference voltage, and having a continuous current mode (CCM) proportional integral amplifier and a discrete current mode (DCM) proportional integral amplifier;

a current loop control module connected to an output terminal of the voltage loop control module and the power factor control circuit, outputting pulse width modulation (PWM) signals to the active switch, having a continuous current compensation unit and a discrete current compensation unit, and generating a current compensation parameter under a CCM or a DCM according to a difference value between a reference current and an inductor current; and a feed-forward control module determining if the power factor control circuit is operated at the CCM or the DCM, generating a feed-forward control parameter under the CCM or the DCM, sending the feed-forward control parameter to the current loop control module, switching to the CCM proportional integral amplifier or the DCM proportional integral amplifier in the voltage loop control module, and switching to the continuous current compensation unit or the discrete current compensation unit in the current loop control module under the CCM or the DCM; and wherein a duty cycle of each PWM signal is equal to a sum of a corresponding feed-forward control parameter generated by the feed-forward control module and a corresponding current compensation parameter generated by the current loop control module.

2. The power factor control circuit as claimed in claim 1, wherein the current compensation parameter of the duty cycle of the outputted PWM signals corresponding to the DCM is equal to a product of the difference value between the reference current and the inductor current and a compensation constant.

3. The power factor control circuit as claimed in claim 2, wherein the feed-forward control module has:

multiple input terminals respectively connected to the output terminal of the voltage loop control module and the input terminal and output terminal of the power factor control circuit; and two output control terminals respectively connected to the current loop control module and the voltage loop control module.

4. The power factor control circuit as claimed in claim 3, wherein the inductor, the diode, the output capacitor and the rectifier are serially connected to constitute a loop;

the active switch is connected between the anode side of the diode and an output terminal of the rectifier;

the current loop control module has the output control terminal of the power factor controller;

the duty cycle of the PWM signals during the CCM is $$\left(1 - \frac{V_{in,sense}}{V_{out}}\right) + \left[\frac{L}{V_{out}T_S}(i_{REF} - I_{L,sense})\right],$$

wherein the feed-forward control parameter in an expression of the duty cycle is $$1 - \frac{V_{in,sense}}{V_{out}},$$

and the current compensation parameter in a second expression of the duty cycle is $$\frac{L}{V_{out}T_S}(i_{REF} - I_{L,sense});$$

and the duty cycle of the PWM signals during the DCM is $$\sqrt{\frac{2L}{V_{in,sense}T_S} \cdot i_{REF} \cdot \left(1 - \frac{V_{in,sense}}{V_{out}}\right)} + F_m(i_{REF} - I_{L,sense}),$$

wherein the feed-forward control parameter in a third expression of the duty cycle is $$\sqrt{\frac{2L}{V_{in,sense}T_S} \cdot i_{REF} \cdot \left(1 - \frac{V_{in,sense}}{V_{out}}\right)},$$

and the current compensation parameter in a fourth expression of the duty cycle is $F_m(i_{REF} - I_{L,sense})$;

wherein

L represents the inductor value;

$V_{in, sense}$ represents the input voltage of the power factor control circuit;

$V_{out, sense}$ represents the output voltage of the power factor control circuit;

$V_{out}$ represents a rated output voltage of the power factor control circuit;

$I_{L,sense}$ represents the inductor current;

$T_s$ represents a cycle of the PWM signal;

$F_m$ represents a compensation constant; and $i_{REF}$ represents a reference current containing the component of the output voltage $V_{out, sense}$ of the power factor control circuit.

5. The power factor control circuit as claimed in claim 4, wherein the feed-forward control module compares two values $D_1$ and $D_2$ calculated as follows;

$$D_1 = \sqrt{\frac{2L}{V_{in,sense}T_S} \cdot i_{REF} \cdot \left(1 - \frac{V_{in,sense}}{V_{out,sense}}\right)}$$

$$D_2 = 1 - \frac{V_{in,sense}}{V_{out,sense}}$$

if $D_1 < D_2$, the feed-forward control module determines that the power factor control circuit is operated at the DCM; and if $D_1 > D_2$, the feed-forward control module determines that the power factor control circuit is operated at the CCM;

wherein

L represents the inductor value;

$V_{in,\ sense}$ represents the input voltage of the power factor control circuit;

$V_{out,\ sense}$ represents the output voltage of the power factor control circuit;

$T_s$ represents a cycle of the PWM signal; and $i_{REF}$ represents a reference current containing the component of the output voltage $V_{out,\ sense}$ of the power factor control circuit.

6. The power factor control circuit as claimed in claim 3, wherein the active switch, the inductor, the output capacitor and the rectifier are serially connected to constitute a loop;

the active switch has a control terminal;

the anode of the diode is connected to an output terminal of the rectifier, and the cathode of the diode is connected between the active switch and the inductor;

the current loop control module has the output control terminal of the power factor controller;

the duty cycle of the PWM signals during the CCM is $$\frac{V_{out}}{V_{in,sense}} + \frac{L}{V_{in,sense}T_S}(i_{REF} - I_{L,sense}),$$

wherein the feed-forward control parameter in the expression of the duty cycle is $$\frac{V_{out}}{V_{in,sense}},$$

and the current compensation parameter in a second expression of the duty cycle is $$\frac{L}{V_{in,sense}T_S}(i_{REF} - I_{L,sense});$$

and the duty cycle of the PWM signals during the DCM is $$\sqrt{\frac{2L}{V_{in,sense}T_S} \cdot i_{REF} \cdot \left(\frac{V_{out}}{V_{in,sense}} - 1\right)} + F_m(i_{REF} - I_{L,sense}),$$

wherein the feed-forward control parameter in a third expression of the duty cycle is $$\sqrt{\frac{2L}{V_{in,sense}T_S} \cdot i_{REF} \cdot \left(\frac{V_{out}}{V_{in,sense}} - 1\right)},$$

and the current compensation parameter in a fourth expression of the duty cycle is $F_m(i_{REF} - I_{L,sense})$;

wherein

L represents the inductor value;

$V_{in,\ sense}$ represents the input voltage of the power factor control circuit;

$V_{out,\ sense}$ represents the output voltage of the power factor control circuit;

$V_{out}$ represents a rated output voltage of the power factor control circuit;

$I_{L,sense}$ represents the inductor current;

$T_s$ represents a cycle of the PWM signal;

$F_m$ represents a compensation constant; and $i_{REF}$ represents a reference current containing the component of the output voltage $V_{out,\ sense}$ of the power factor control circuit.

7. The power factor control circuit as claimed in claim 6, wherein the feed-forward control module compares two values $D_1$ and $D_2$ calculated as follows;

$$D_1 = \sqrt{\frac{2L}{V_{in,sense}T_S} \cdot i_{REF} \cdot \left(\frac{V_{out,sense}}{V_{in,sense}} - 1\right)}$$

$$D_2 = \frac{V_{out,sense}}{V_{in,sense}}$$

if $D_1 < D_2$, the feed-forward control module determines that the power factor control circuit is operated at the DCM; and if $D_1 > D_2$, the feed-forward control module determines that the power factor control circuit is operated at the CCM;

wherein

L represents the inductor value;

$V_{in,\ sense}$ represents the input voltage of the power factor control circuit;

$V_{out,\ sense}$ represents the output voltage of the power factor control circuit;

$T_s$ represents a cycle of the PWM signal; and $i_{REF}$ represents a reference current containing the component of the output voltage $V_{out,\ sense}$ of the power factor control circuit.

8. The power factor control circuit as claimed in claim 1, wherein the feed-forward control module has:

multiple input terminals respectively connected to the output terminal of the voltage loop control module and the input terminal and output terminal of the power factor control circuit; and two output control terminals respectively connected to the current loop control module and the voltage loop control module.

9. The power factor control circuit as claimed in claim 8, wherein the inductor, the diode, the output capacitor and the rectifier are serially connected to constitute a loop;

the active switch is connected between the anode side of the diode and an output terminal of the rectifier;

the current loop control module has the output control terminal of the power factor controller;

the duty cycle of the PWM signals during the CCM is $$\left(1 - \frac{V_{in,sense}}{V_{out}}\right) + \left[\frac{L}{V_{out}T_S}(i_{REF} - I_{L,sense})\right],$$

wherein the feed-forward control parameter in an expression the duty cycle is $$1 - \frac{V_{in,semse}}{V_{out}},$$

and the current compensation parameter in a second expression of the duty cycle is $$\frac{L}{V_{out}T_S}(i_{REF} - I_{L,sense});$$

and
the duty cycle of the PWM signals during the DCM is $$\sqrt{\frac{2L}{V_{in,sense}T_S} \cdot i_{REF} \cdot \left(1 - \frac{V_{in,sense}}{V_{out}}\right)} + F_m(i_{REF} - I_{L,sense}),$$

wherein the feed-forward control parameter in a third expression of the duty cycle is $$\sqrt{\frac{2L}{V_{in,sense}T_S} \cdot i_{REF} \cdot \left(1 - \frac{V_{in,sense}}{V_{out}}\right)},$$

and the current compensation parameter in a expression of the duty cycle is $F_m(i_{REF}-I_{L,sense})$;
wherein
L represents the inductor value;
$V_{in,\ sense}$ represents the input voltage of the power factor control circuit;
$V_{out,\ sense}$ represents the output voltage of the power factor control circuit;
$V_{out}$ represents a rated output voltage of the power factor control circuit;
$I_{L,sense}$ represents the inductor current;
$T_s$ represents a cycle of the PWM signal;
$F_m$ represents a compensation constant; and
$i_{REF}$ represents a reference current containing the component of the output voltage $V_{out,\ sense}$ of the power factor control circuit.

10. The power factor control circuit as claimed in claim 9, wherein
the feed-forward control module compares two values $D_1$ and $D_2$ calculated as follows;

$$D_1 = \sqrt{\frac{2L}{V_{in,sense}T_S} \cdot i_{REF} \cdot \left(1 - \frac{V_{in,sense}}{V_{out,sense}}\right)}$$

$$D_2 = 1 - \frac{V_{in,sense}}{V_{out,sense}}$$

if $D_1<D_2$, the feed-forward control module determines that the power factor control circuit is operated at the DCM; and
if $D_1>D_2$, the feed-forward control module determines that the power factor control circuit is operated at the CCM;
wherein
L represents the inductor value;
$V_{in,\ sense}$ represents the input voltage of the power factor control circuit;
$V_{out,\ sense}$ represents the output voltage of the power factor control circuit;
$T_s$ represents a cycle of the PWM signal; and
$i_{REF}$ represents a reference current containing the component of the output voltage $V_{out,\ sense}$ of the power factor control circuit.

11. The power factor control circuit as claimed in claim 8, wherein
the active switch, the inductor, the output capacitor and the rectifier are serially connected to constitute a loop;
the active switch has a control terminal;
an anode of the diode is connected to an output terminal of the rectifier, and the cathode of the diode is connected between the active switch and the inductor;
the current loop control module has the output control terminal of the power factor controller;
the duty cycle of the PWM signals during the CCM is $$\frac{V_{out}}{V_{in,sense}} + \frac{L}{V_{in,sense}T_S}(i_{R_{EF}} - I_{L,sense}),$$

wherein the feed-forward control parameter in the expression of the duty cycle is $$\frac{V_{out}}{V_{in,sense}},$$

and the current compensation parameter in a second expression of the duty cycle is $$\frac{L}{V_{in,sense}T_S}(i_{R_{EF}} - I_{L,sense});$$

and
the duty cycle of the PWM signals during the DCM is $$\sqrt{\frac{2L}{V_{in,sense}T_S} \cdot i_{REF} \cdot \left(\frac{V_{out}}{V_{in,sense}} - 1\right)} + F_m(i_{REF} - I_{L,sense}),$$

wherein the feed-forward control parameter in a third expression of the duty cycle is $$\sqrt{\frac{2L}{V_{in,sense}T_S} \cdot i_{REF} \cdot \left(\frac{V_{out}}{V_{in,sense}} - 1\right)},$$

and the current compensation parameter in a fourth expression of the duty cycle is $F_m(i_{REF}-I_{L,sense})$;
wherein
L represents the inductor value;
$V_{in,\ sense}$ represents the input voltage of the power factor control circuit;
$V_{out,\ sense}$ represents the output voltage of the power factor control circuit;
$V_{out}$ represents a rated output voltage of the power factor control circuit;
$I_{L,sense}$ represents the inductor current;
$T_s$ represents a cycle of the PWM signal;
$F_m$ represents a compensation constant; and
$i_{REF}$ represents a reference current containing the component of the output voltage $V_{out,\ sense}$ of the power factor control circuit.

12. The power factor control circuit as claimed in claim 11, wherein
the feed-forward control module compares two values $D_1$ and $D_2$ calculated as follows;

$$D_1 = \sqrt{\frac{2L}{V_{in,sense}T_S} \cdot i_{REF} \cdot \left(\frac{V_{out,sense}}{V_{in,sense}} - 1\right)}$$

$$D_2 = \frac{V_{out,sense}}{V_{in,sense}}$$

if $D_1<D_2$, the feed-forward control module determines that the power factor control circuit is operated at the DCM; and if $D_1>D_2$, the feed-forward control module determines that the power factor control circuit is operated at the CCM;

wherein

L represents the inductor value;

$V_{in,\,sense}$ represents the input voltage of the power factor control circuit;

$V_{out,\,sense}$ represents the output voltage of the power factor control circuit;

$T_s$ represents the cycle of a PWM signal; and $i_{REF}$ represents a reference current containing the component of the output voltage $V_{out,\,sense}$ of the power factor control circuit.

13. A power factor control method executed in a power factor control circuit having an inductor, the power factor control method comprising steps of:

determining if a present current mode operated by the power factor control circuit is a continuous current mode (CCM) or a discrete current mode (DCM);

if the present current mode is the CCM, outputting a pulse width modulation (PWM) signal, wherein a duty cycle of the PWM signal under the CCM is equal to a sum of a feed-forward control parameter and a current compensation parameter, and the current compensation parameter has a difference value of a reference current and an inductor current; and if the present current mode is the DCM, outputting the PWM signal, wherein the duty cycle of the PWM signal under the DCM is equal to a sum of a feed-forward control parameter and a the current compensation parameter, and the current compensation parameter has a difference value of a reference current and an inductor current;

wherein the duty cycle of the PWM signals during the CCM is expressed by $$\left(1 - \frac{V_{in,sense}}{V_{out}}\right) + \left[\frac{L}{V_{out}T_S}(i_{REF} - I_{L,sense})\right],$$

wherein the feed-forward control parameter in an expression of the duty cycle is $$1 - \frac{V_{in,sense}}{V_{out}},$$

and the current compensation parameter in a second expression of the duty cycle is $$\frac{L}{V_{out}T_S}(i_{REF} - I_{L,sense});$$

and the duty cycle of the PWM signals during the DCM is expressed by $$\sqrt{\frac{2L}{V_{in,sense}T_S} \cdot i_{REF} \cdot \left(1 - \frac{V_{in,sense}}{V_{out}}\right)} + F_m(i_{REF} - I_{L,sense}),$$

wherein the feed-forward control parameter in a third expression of the duty cycle is $$\sqrt{\frac{2L}{V_{in,sense}T_S} \cdot i_{REF} \cdot \left(1 - \frac{V_{in,sense}}{V_{out}}\right)},$$

and the current compensation parameter in the expression of the duty cycle is $F_m(i_{REF}-I_{L,sense})$;

wherein

L represents the inductor value;

$V_{in,\,sense}$ represents the input voltage of the power factor control circuit;

$V_{out,\,sense}$ represents the output voltage of the power factor control circuit;

$V_{out}$ represents a rated output voltage of the power factor control circuit;

$I_{L,sense}$ represents the inductor current;

$T_s$ represents a cycle of the PWM signal;

$F_m$ represents a compensation constant; and $i_{REF}$ represents the reference current containing the component of the output voltage $V_{out,\,sense}$ of the power factor control circuit.

14. The power factor control method as claimed in claim 13, comparing two values $D_1$ and $D_2$ calculated as follows in the step of determining the present current mode operated by the power factor control circuit;

$$D_1 = \sqrt{\frac{2L}{V_{in,sense}T_S} \cdot i_{REF} \cdot \left(1 - \frac{V_{in,sense}}{V_{out,sense}}\right)}$$
$$D_2 = 1 - \frac{V_{in,sense}}{V_{out,sense}}$$

if $D_1<D_2$, determining that the power factor control circuit is operated at the DCM; and if $D_1>D_2$, determining that the power factor control circuit is operated at the CCM;

wherein

L represents the inductor value;

$V_{in,\,sense}$ represents the input voltage of the power factor control circuit;

$V_{out,\,sense}$ represents the output voltage of the power factor control circuit;

$T_s$ represents a cycle of the PWM signal; and $i_{REF}$ represents a reference current containing the component of the output voltage $V_{out,\,sense}$ of the power factor control circuit.

15. A power factor control method executed in a power factor control circuit having an inductor, the power factor control method comprising steps of:

determining if a present current mode operated by the power factor control circuit is a continuous current mode (CCM) or a discrete current mode (DCM);

if the present current mode is the CCM, outputting a pulse width modulation (PWM) signal, wherein a duty cycle of the PWM signal under the CCM is equal to a sum of a feed-forward control parameter and a current compensation parameter, and the current compensation parameter has a difference value between a reference current and an inductor current; and if the present current mode is the DCM, outputting the PWM signal, wherein the duty cycle of the PWM signal under the DCM is equal to the sum of the feed-forward control parameter and the current compensation parameter, and the current compensation parameter has the difference value between the reference current and the inductor current;

wherein the duty cycle of each PWM signal during the CCM is expressed by $$\frac{V_{out}}{V_{in,sense}} + \frac{L}{V_{in,sense}T_S}(i_{REF} - I_{L,sense}),$$

wherein the feed-forward control parameter in an expression of the duty cycle is $$\frac{V_{out}}{V_{in,sense}},$$

and the current compensation parameter in a second expression of the duty cycle is $$\frac{L}{V_{in,sense}T_S}(i_{REF} - I_{L,sense});$$

and
the duty cycle of each PWM signal during the DCM is expressed by $$\sqrt{\frac{2L}{V_{in,sense}T_S} \cdot i_{REF} \cdot \left(\frac{V_{out}}{V_{in,sense}} - 1\right)} + F_m(i_{REF} - I_{L,sense}),$$

wherein the feed-forward control parameter in a third expression of the duty cycle is $$\sqrt{\frac{2L}{V_{in,sense}T_S} \cdot i_{REF} \cdot \left(\frac{V_{out}}{V_{in,sense}} - 1\right)},$$

and the current compensation parameter in a fourth expression of the duty cycle is $F_m(i_{REF} - I_{L,sense})$;
wherein
L represents an inductance value;
$V_{in,\ sense}$ represents the input voltage of the power factor control circuit;
$V_{out,\ sense}$ represents the output voltage of the power factor control circuit;
$V_{out}$ represents a rated output voltage of the power factor control circuit;
$I_{L,sense}$ represents the inductor current;
$T_s$ represents a cycle of the PWM signal;
$F_m$ represents a compensation constant; and
$i_{REF}$ represents the reference current containing the component of the output voltage $V_{out,\ sense}$ of the power factor control circuit.

16. The power factor control method as claimed in claim 15,
comparing two values, $D_1$ and $D_2$, calculated as follows in the step of determining the present current mode operated by the power factor control circuit;

$$D_1 = \sqrt{\frac{2L}{V_{in,sense}T_S} \cdot i_{REF} \cdot \left(\frac{V_{out,sense}}{V_{in,sense}} - 1\right)}$$

$$D_2 = \frac{V_{out,sense}}{V_{in,sense}}$$

if $D_1 < D_2$, determining that the power factor control circuit is operated at the DCM; and
if $D_1 > D_2$, determining that the power factor control circuit is operated at the CCM;
wherein
L represents the inductor value;
$V_{in,\ sense}$ represents the input voltage of the power factor control circuit;
$V_{out,\ sense}$ represents the output voltage of the power factor control circuit;
$T_s$ represents a cycle of the PWM signal; and
$i_{REF}$ represents a reference current containing the component of the output voltage $V_{out,\ sense}$ of the power factor control circuit.

* * * * *